Nov. 20, 1945. L. E. NICKLA ET AL 2,389,533
COTTON CONVEYER BLOWER
Filed April 19, 1945 2 Sheets-Sheet 1

Inventors:
Louis E. Nickla,
and Arthur R. Crawford.
By Paul O. Pippel
Atty.

Nov. 20, 1945.   L. E. NICKLA ET AL   2,389,533
COTTON CONVEYER BLOWER
Filed April 19, 1945   2 Sheets-Sheet 2
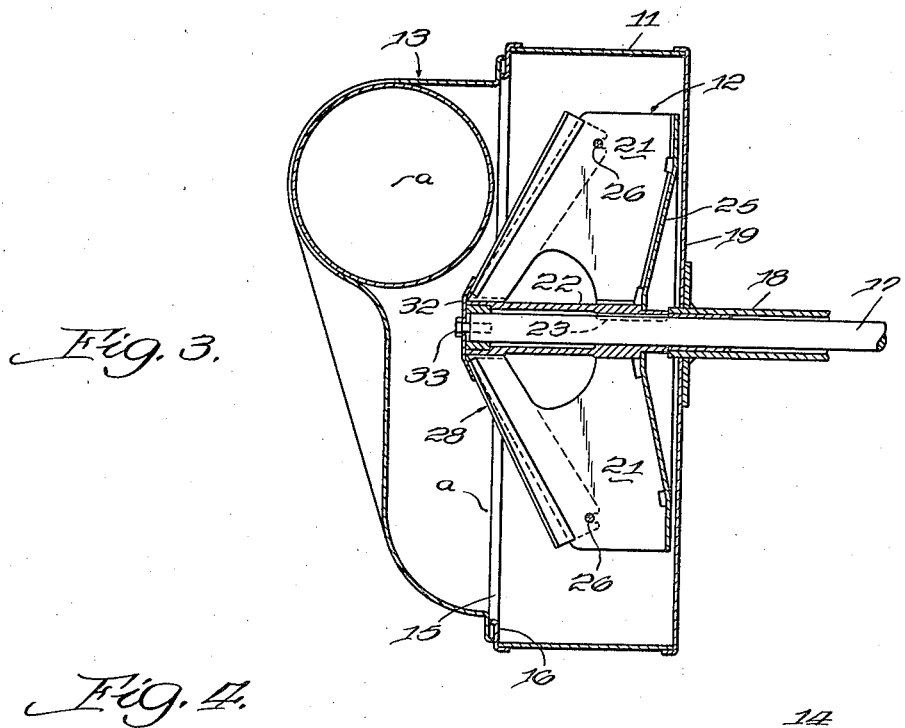
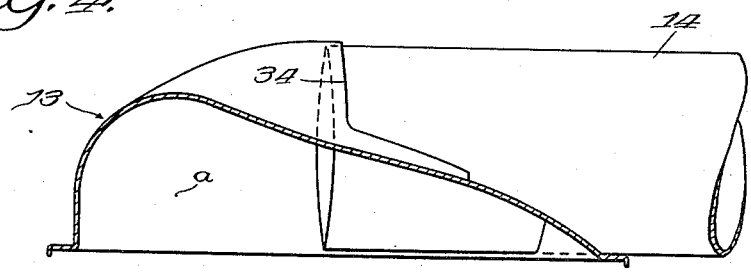
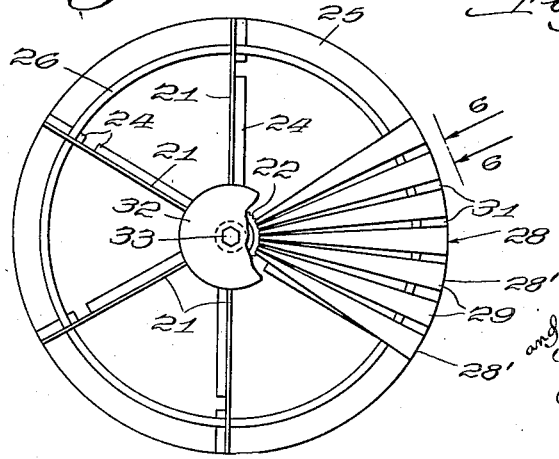
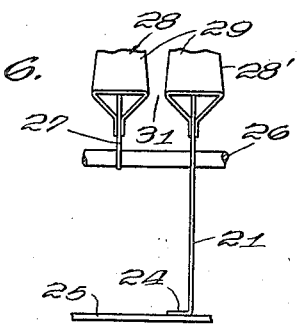
Inventors:
Louis E. Nickla
and Arthur R. Crawford.
By Paul O. Pippel
Atty.

Patented Nov. 20, 1945

2,389,533

UNITED STATES PATENT OFFICE 2,389,533

COTTON CONVEYER BLOWER

Louis E. Nickla, Cicero, and Arthur R. Crawford, Riverside, Ill., assignors to International Harvester Company, a corporation of New Jersey Application March 19, 1945, Serial No. 583,566

4 Claims. (Cl. 302—37)

This invention concerns blowers for energizing pneumatic conveyer systems and primarily relates to an improved blower vestibule which introduces material-laden air into a blower in a fashion expediting passage of the material therethrough without impact with or by the bladed rotor.

The invention is particularly useful in a pneumatic system for conveying cotton from a mechanical cotton picking unit to a cotton receptacle transported with the unit across a field of cotton plants being harvested. A characteristic of cardinal importance in the operation of a fan or blower in such a system is that it shall not cause the cotton seeds to strike or be struck by any surface with sufficient impact to be broken or cracked thereby. When the hard impervious surfaces of seeds are ruptured, the oil leaks out making them less valuable to seed processing mills and also discolor the cotton whereby its grade and value are lowered.

A general object of this invention is the provision of a cotton conveying blower so constructed that the cotton seeds will be treated with sufficient gentleness to avoid breaking their shells. This is accomplished by constructing the blower so the blades of its rotor are prevented from striking the cotton and the seeds.

A more specific object is the provision in a blower of a casing with a vestibule spaced axially from the rotor and having a tangential air and cotton inlet and a cotton deflecting wall receiving the cotton by way of said inlet and leading circumferentially of the casing as well as axially thereof for shunting the cotton about the rotor onto the interior of the casing radially outwardly therefrom.

The above and other desirable objects inherent in and encompassed by the invention will be better understood upon reading the ensuing description with reference to the annexed drawings, wherein:

Figure 3 is a vertical sectional view taken on a plane extending axially of the blower and in the direction indicated by the arrows 3—3 in Figure 2;

Figure 4 is a horizontal sectional view looking upwardly on a plane as indicated by the arrows 4—4 in Figure 2;

Figure 5 is a back end elevational view of the fan rotor employed in the blower; and Figure 6 is a fragmentary view looking radially of the rotor from an edge thereof as indicated by the line 6—6 in Figure 5.

Figure 1:
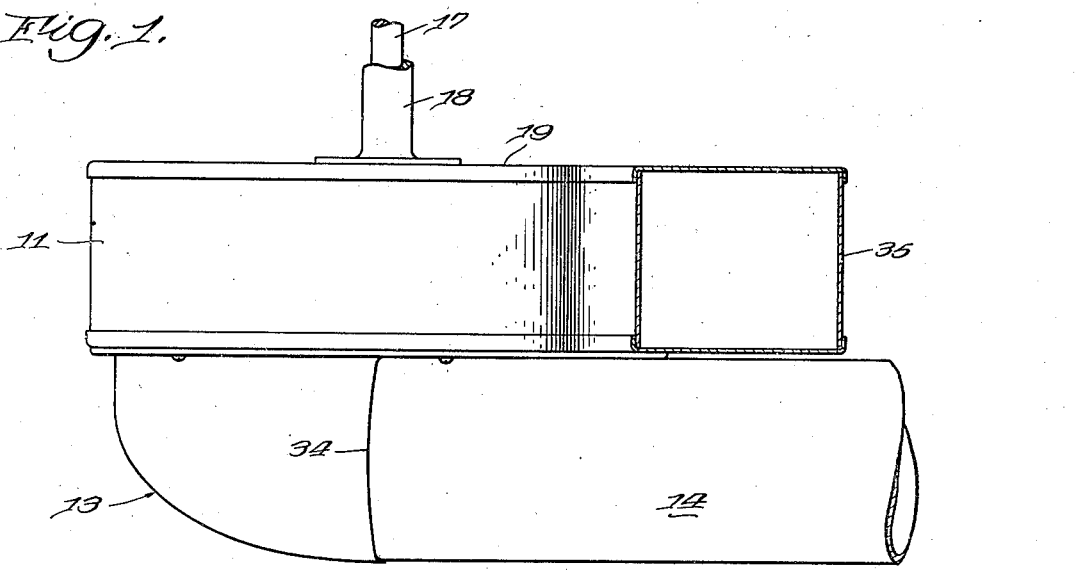
Figure 1 is a plan view of a blower constructed according to the principles of this invention.

With continued reference to the drawings, the blower casing comprises a generally cylindrical wall 11 extending circumferentially about a bladed rotor 12 in radially spaced relation therewith. A vestibule 13 of the blower casing is disposed between that part of the casing surrounded by the cylindrical wall 11 and an inlet conduit 14. A circular opening 15 in the rear end wall 16 of the main part of the casing is in communicative coaxial relation with the rear admittance end of the rotor and provides communication between the vestibule and the main part of the casing.

The rotor 12 is fixed for rotation with a drive shaft 17 therefor rotatable within a bearing 18 carried within the front wall 19 of the casing. This rotor comprises six impeller blades 21 radiating equiangularly from a hub 22 which is splined to the shaft 17 as indicated at 23. Said blades are secured at their front edges by means of flanges 24 to an end plate 25 which assists in maintaining the equiangular relation of said blades. A circular wire or rod 26 passes through rearward portions of the blades near their outer ends, and this member assists the plate 25 in maintaining the blades in the desired formation. The circular rod 26 also provides a support for radiating elements 27 of a fan guard assembly 28. In the present arrangement there are five of these radiating elements 27 disposed between adjacent ones of the impeller blades 21. Sheet metal crown strips 28' are attached to the rear edges of the members 27 and of the impeller blades 21, elongated center sections of these crown strips forming spaced segments 29 of the conical guard assembly, while opposite edge portions of said strips are carried together and welded or otherwise suitably secured to the opposite sides of the part 27 or 21 with which they are respectfully associated. The entire guard assembly is conical with radiating slots 31 between the radial elements 28'. The inner ends of the elements 28' are held against an enlarged rear end portion of the hub 22 by a cap 32 and a cap screw 33 turned into the back end of the drive shaft 17.

The generally circular vestibule 13 has a concave inner side facing the rotor 12 and of greater diameter than such rotor so that the cotton from cotton-laden air can slide from the inner periphery of the vestibule onto the cylindrical wall 11 of the main portion of the casing without coming into contact with the rotor blades and by a minimum of contact, if any, with the fan guard structure. There is a graduation in depth of the concave inner periphery of the vestibule, the graduation in depth being in an axial direction, with reference to the rotor, and circumferentially of the structure. A circumferential portion of the vestibule wall conforms to a torous having an axis a—a of generation, see Figs. 2, 3, and 4. The point of greatest cavity depth for this circumferential portion of graduated depth in an axial direction is at the upper side where an inlet opening 34 is formed for the reception of an end of the inlet conduit 14. The rearmost portion of the vestibule wall generated about the axis a—a forms a deflector wall for cotton entering the vestibule through the conduit 14, this deflector wall leading circumferentially of the rotor axis and axially of the rotor onto the wall 11 in circumscribing relation with the rotor.

Figure 2:
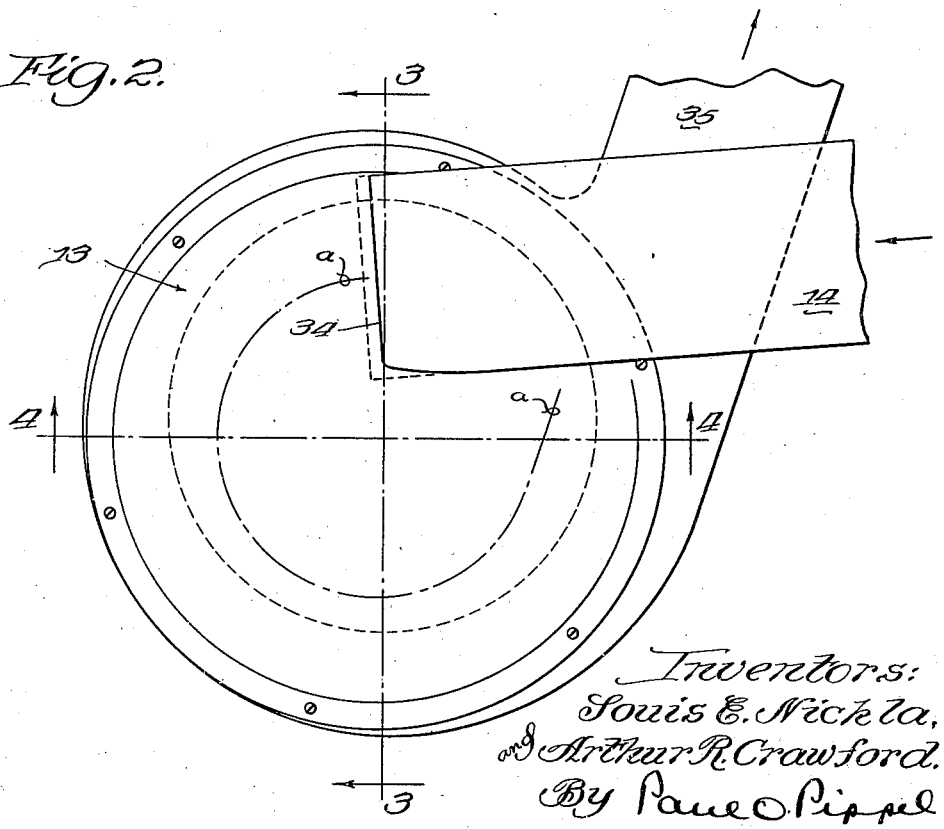
Figure 2 is a back end elevation of the blower of Figure 1.

In the operation of the blower, the rotating rotor 12 discharges air centrifugally in a radial outward direction against the cylindrical discharge wall 11, the rotation of the rotor being counter-clockwise as the apparatus is viewed from the rear in Figures 2 and 5, so that the air discharged from the wall 11 is upwardly through an outlet conduit 35. Air thus discharged from the spaces between the fan or rotor blades 21 is replaced by air forced by the atmosphere through a cotton picking unit (not shown) where such air is laden with cotton and proceeds into the vestibule 13 through the conduit 14. Such cotton is, of course, seed cotton of which the seeds are to be protected. The inlet opening 34 is arranged so that the conduit 14 discharges into the vestibule tangentially of the interior helical wall periphery generated about the axis a—a forming an inlet passage leading from said opening or entrance circumferentially of the rotor axis and axially of the rotor onto the interior periphery of the rotor circumscribing wall 11 en route to the discharge conduit 35. Because of the somewhat helically curved profile of the vestibule wall portion engaged by the said cotton, such cotton has no sudden impact against this wall portion and is guided thereby gently onto the cylindrical wall 11. There can be no striking of the said cotton by the fan blades 21, since the radial slots 31 in the guard assembly are too narrow for permitting cotton to enter these slots, although the air entering the rotor does pass through these slots into the space between the fan blades from where it is centrifugally ejected.

Having thus described the preferred form of the invention as well as the objects, purposes, and advantages thereof with the view of fully illustrating the invention, we claim:

1. A seed cotton transferring blower comprising a fan blade rotor having air admittance at an end and radial discharge of such air, a rotor casing including a wall spacedly circumscribing the rotor in radial registry therewith and having a discharge passage for the blower, and a vestibule disposed oppositely to the air admittance end of the rotor out of radial registry therewith, said vestibule containing an inlet passage portion in the form of a helical cotton-deflector wall leading circumferentially of the rotor axis and axially of the rotor onto said circumscribing wall.

2. A seed cotton transferring blower comprising a fan blade rotor having air admittance at an end and radial discharge of such air, a rotor casing including a wall spacedly circumscribing the rotor in radial registry therewith and having a discharge passage for the blower, and a vestibule disposed oppositely to said air admittance end of the rotor out of radial registry therewith, said vestibule having an entrance spaced radially from the rotor axis and disposed for the reception of a cotton-laden air stream directed normally to the direction the entrance is spaced from said axis, and said vestibule having an interior helical wall periphery forming an inlet passage leading from said entrance circumferentially of said axis and axially of the rotor onto the inner periphery of said circumscribing wall.

3. In a seed cotton transferring blower comprising a fan rotor with an air admittance end and a rotor casing having a circular discharge wall about the rotor in radial spaced relation thereto and also having an air admittance end with an opening in communicative coaxial relation with the admittance end of said rotor, a vestibule-forming cover member for said opening, said cover member having a concave inner side of graduated depth circumferentially of said member, and a cotton-laden air entrance leading tangentially thereinto from the exterior at the portion of greatest depth of the cavity and generally in the direction of lessening depth of the cavity.

4. In a seed cotton transferring blower; a rotor with an air admittance end and radial discharge; and a rotor casing comprising a circular discharge wall about said rotor in radial spaced relation thereto, and a circular vestibule-forming wall in opposed spaced relation to the admittance end of the rotor, the last named wall having a concave inner side of greater diameter than the rotor and leading axially thereof onto said circular wall, the cavity depth in said wall being graduated in an axial direction circumferentially thereof and having a cotton-laden air entrance leading tangentially thereinto at the portion of greatest cavity depth and in the direction of lessening depth of the cavity.

LOUIS E. NICKLA.
ARTHUR R. CRAWFORD.